Dec. 4, 1956        F. BORDONI        2,772,745
HELICOPTER WITH DUAL COAXIAL VARIABLE PITCH ROTORS
Filed April 2, 1951        7 Sheets-Sheet 1

INVENTOR
F. BORDONI

ATTORNEY

Dec. 4, 1956  F. BORDONI  2,772,745
HELICOPTER WITH DUAL COAXIAL VARIABLE PITCH ROTORS
Filed April 2, 1951  7 Sheets-Sheet 2

INVENTOR
F. BORDONI
BY Wenderoth, Lind and Ponack
ATTORNEY

Dec. 4, 1956   F. BORDONI   2,772,745
HELICOPTER WITH DUAL COAXIAL VARIABLE PITCH ROTORS
Filed April 2, 1951.   7 Sheets-Sheet 3

INVENTOR
F. BORDONI

BY Wenderoth, Lind and Ponack

ATTORNEY

Dec. 4, 1956 F. BORDONI 2,772,745
HELICOPTER WITH DUAL COAXIAL VARIABLE PITCH ROTORS
Filed April 2, 1951

INVENTOR
F. BORDONI
BY Wenderoth, Lind and Ponack
ATTORNEY

United States Patent Office 2,772,745
Patented Dec. 4, 1956

2,772,745

HELICOPTER WITH DUAL COAXIAL VARIABLE PITCH ROTORS

Ferdinando Bordoni, Rome, Italy

Application April 2, 1951, Serial No. 218,841

Claims priority, application Italy April 8, 1950

5 Claims. (Cl. 170—135.24)

The present invention relates to an improved helicopter, of the type wherein the possibility of maintaining the machine stationary in the air, and to lift or to lower same vertically and also to move it in a horizontal as well as in oblique direction, is achieved by means of two coaxial propellers rotating in opposite directions.

This type of helicopter has obvious advantages of compactness and lightness as compared to helicopters having non-coaxial propellers, as well as advantages of efficiency, facility of control and safety on the ground as compared with helicopters having a single main propeller and an auxiliary propeller for compensation of the torque.

The construction of this type of helicopter gives rise to certain difficulties, due to the necessity of having two propellers placed on the same geometrical axis rotate in opposite directions, and to the necessity of having the controls of the incidence angle variation of the upper propeller blades pass through the lower propeller.

It is an obect of this invention to overcome said difficulties; other purposes of this invention are to provide improvements in the articulated connections of the blades and in the incidence angle variation controls.

Some preferred forms of embodiment of this invention are shown in the accompanying drawings, wherein.

With reference to the drawings.

According to the present invention, the power drive from the motor to the two coaxial propellers rotating in opposite direction, is through a shaft rotating at the same speed as the motor (or at a slightly different speed); said shaft is contained in a stationary tube connected to the body, and the two propellers rotate on bearings around said tube.

The propellers are driven through two speed reduction gear mechanisms (one for each propeller) of the type having a central pinion, satellite pinions with fixed shafts, and an internally toothed annular gear fixed to the propellers.

The mechanical solution of the problem of driving the propellers requiring a long shaft which extends to the upper propeller automatically solves the problem of the fluctuations of the driving torque and of the resistance torque.

The upper speed reduction gearing has one or more satellite pinions (preferably three); the lower spaced reducer has one or more pairs of satellite pinions (preferably three pairs), so that the motion transmitted to the lower annular gear is opposite in direction with respect to the movement of the upper propeller; large open spaces remain between the lower pairs of satellite pinions, said spaces permitting the easy passage of the control elements for the variation of angle of incidence of the upper propeller and for facilitating the connection between the upper end and the lower part of the stationary tube.

Figures 1, 2, 3:
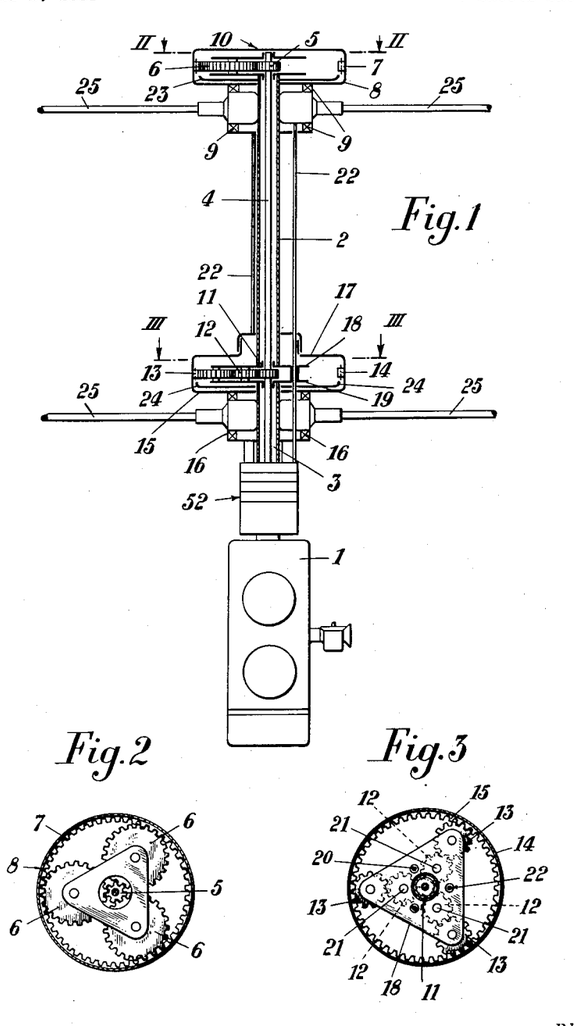
Fig. 1 shows, in elevation, partially cross-sectioned, the motor and its connection with the propellers.
Fig. 2 is a plan view of the upper speed reduction gearing driving the upper propeller.
Fig. 3 is a plan view of the lower speed reduction gearing driving the lower propeller.

The aforesaid mechanism is diagrammatically illustrated in Fig. 1. In said figure, 1 identifies the motor, preferably arranged so as to have its shaft vertical, and 2 and 3 indicate the upper and lower parts of the stationary tube or supporting column attached to the motor and the body.

The motor 1 causes the shaft 4 to rotate and said shaft runs inside the column formed by the tubes 2 and 3.

At the upper end of the tube 2 is positioned the upper speed reduction gearing, shown in plan view in Fig. 2, comprising the central pinion 5, satellite pinions 6 and an internally toothed annular gear 7; this latter is connected to a drum 8 rotating on the bearings 9 and driving the upper propeller 10.

Below the upper speed reduction gearing, intermediate on the tubes 2 and 3, is the lower speed reduction gearing, the plan view of which is diagrammatically shown in Fig. 3; said speed reduction gearing comprises the pinion 11, satellite pinion pairs 12 and 13 and the internally toothed annular gear 14; this latter is connected to a drum 15, rotating on the bearings 16 and driving the lower propeller 17.

The flanges 18 and 19 of the lower speed reducer are connected to each other by bolts 20 (Fig. 3) and by the bolts 21, the latter forming the shafts around which the satellite pinions 12 rotate. The flanges are also attached to the tube 3.

The bolts 20 and 21 are hollow and therefore the rods 22 controlling the variation of the incidence angle of the upper speed reducer easily pass through the bolts.

In order to lubricate the speed reducers, oil under pressure from the motor is sent along an axial bore of the shaft 4 and reaches the upper speed reduction gearing, from which it passes through the stationary tube 2 to lubricate the lower speed reduction gearing, and then passes into the tube 3 from which it returns to the motor 1.

It is necessary to prevent the centrifugal force from causing the drums 8 and 15 to be filled with oil, therefore inside the speed reducers are fastened discs 23 and 24 (or if desired, stationary tubes) which almost reach the internally toothed annular gears; they collect any oil which might accumulate in the drums under the action of the centrifugal force and return it back to the stationary tube.

The propellers 10 and 17 each have two blades.

In helicopter propellers, the blades are generally connected to their hub by means of cardan joints, allowing them to be oriented according to the resultant of the centrifugal force, the axial thrust, and the resistance to rotation.

The cardan joints may be replaced by hinges having their axes horizontal, and in this case the blades are free to flap in the vertical direction and are oriented according to the resultant of the centrifugal force and of the axial thrust, the resistance to rotation being taken by the blades in the form of bending stress.

The cardan joint or the aforesaid hinges may also be replaced by elements which flex suitably in all directions, or only in the vertical direction. Both the cardan joint and the flexible elements may be eliminated by constructing the blades so that the portion adjacent the hub is sufficiently flexible to stand the stresses.

The blades 25 of the propellers 10 and 17 are provided with cardan joints or hinges or flexible elements 26 (Figs. 4 and 5); which directly connect them to rings or hubs 27 which may tilt with respect to the shaft 4 around pivots 28.

Figure 4:
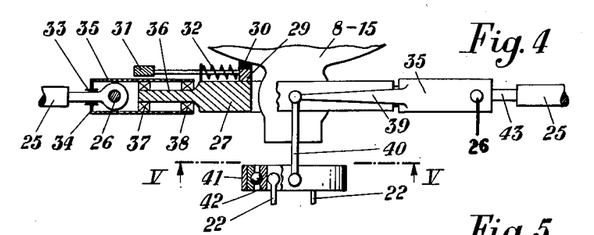
Figs. 4 and 5 are an elevation view, partially in cross-section, and a plan view, respectively, an embodiment of the connections of the propeller blades with the shaft.
Figure 5:
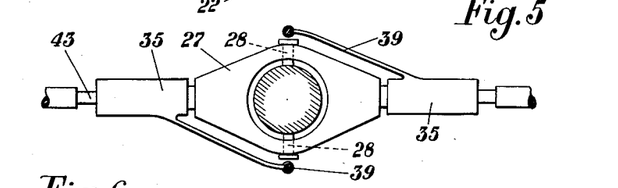
Figure 5A:
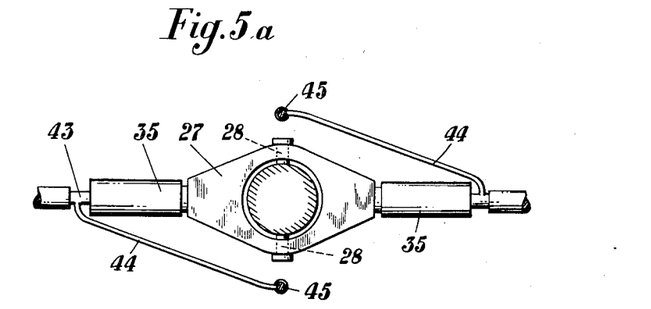
Fig. 5a is a modified form of construction for the connection of the propeller blades with the shaft.

Naturally the hubs are continuously oriented according to the resultant in the vertical plane of the stresses acting on the blades, and therefore substantially direct the resultant of the axial thrust onto the geometrical axis of the propeller, as if the articulated connections 26 were positioned to coincide with said axis and not at a certain distance therefrom, as is necessary for obvious structural reasons.

Another advantage of the present type of hub is the following: As is known, in many flight phases of helicopters, the blades rhythmically flap in a vertical direction; more precisely, when a blade is lifted, the opposite one is lowered; therefore if there were no tiltable hubs, the articulated connections between the blades and the hubs would work continuously. By adopting the tilting hubs, the articulated connections remain almost fixed and the hubs tilt rhythmically; thus the articulated connections supporting the considerable centrifugal stresses of the blades remain almost stationary, and the tilting motion is transferred to pivots 28 of the hubs which support only the axial thrust and the stresses due to drag on the propellers, which thrust and stresses are considerably less than the centrifugal stresses.

During operation, the blades 25 and therefore also the hubs 27, assume well defined positions under the effect of the acting forces and particularly of the centrifugal forces; but in the starting phases, when the rotation speed is still low, the blades may have abnormal positions, which is very dangerous in helicopters having coaxial propellers rotating in opposite directions, because the blades of one propeller may strike the blades of the other propeller.

In some apparatus of this type, the aforesaid danger is avoided by providing each blade with a stop which prevents flapping, which stop frees the blade only when a predetermined rotation speed is reached.

According to a preferred embodiment of the present invention, in order to attain this object, the individual blades are not blocked, but the hubs are provided with stops preventing said hubs from tilting on the pivots 28 until a given speed of rotation has been reached.

The said stops may be formed as wedges or cylinders and provided with blocks or rubber coatings, which gradually displace in one or in the other direction, under the action of the centrifugal force or springs, and act smoothly and progressively to free or stop the hubs.

A form of said device is diagrammatically shown in Figs. 4 and 5. In said Figs. the wedges 29, provided with rubber blocks 30 and carrying additional masses 31, are urged by springs 32, positioned between the hubs 27 and the drum 8 (or 15), against the drum so as to prevent any tilting of the hubs; when the rotation speed reaches a suitable value, the wedges 29 are thrown outward by the centrifugal force and progressively free the hubs.

Figure 6:
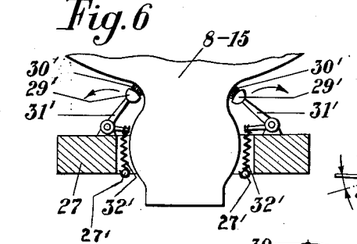
Fig. 6 is an elevation view of an embodiment of a device for automatically preventing the propeller's hubs from tilting.

A different form of the device is diagrammatically illustrated in Fig. 6. In said figure, the elements 29', provided with a rubber coating 30', are carried by arms 31' and press against the drum 8 (or 15), so as to prevent any tilting of the hubs 27; when the rotation speed has reached a suitable value, the arms 31' turn outwards under the action of centrifugal force and against the action of springs 32' attached to arms 31' and pieces 27' on hubs 27, so that the hubs are freed.

Each blade 25 surrounded by rubber rings 33 is free to flap around the articulated joint 26 within preestablished limits defined by suitable stops 34; the analysis of the movements of the blades easily shows that by using the tilting hubs, said limits of individual movement may be made small enough to eliminate any danger of collision of the blades with one another when the hubs are prevented from tilting.

The control of the variation of the inclination of the blades of each propeller is effected by a known swash plate mechanism; each blade 25 is first of all free to rotate around its own longitudinal axis, since the articulated joints 26 are mounted on sleeves 35 which rotate on pivots 36 (fixed to the hubs 27) by means of the bearings 37 and 38. The sleeves 35 are provided with levers 39 which, through link-rods 40, are controlled by a rotating ring 41. The ring 41 is guided by ring 42 which does not rotate, but which may be lifted, lowered and also inclined at will by means of three rods 22. By this means the inclination of the blades may be varied which permits all the desired maneuvers to be effected.

If, for instance, the pilot wishes to increase or to decrease the altitude of the helicopter, he may lift or lower the rings 42 of the two propellers at the same time, and in this way the inclination of all the blades is increased or reduced, the lifting thrust is increased or reduced and the helicopter rises or descends, as desired.

It is to be noted that sudden gusts of wind may suddenly change the relative incidence of the blades causing an undesired variation of the lifting thrusts and compelling the pilot to take steps to reestablish the proper conditions.

It would obviously be desirable that said sudden variations of lifting power, due to external causes, be automatically eliminated or at least reduced, so as to simplify the pilot's task.

Figure 7:
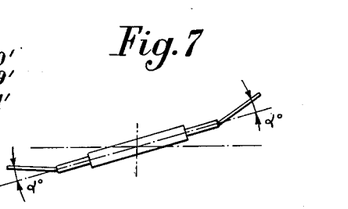
Fig. 7 is an elevation view of the arrangement of the hub of a propeller when the blades turn obliquely with respect to the axis of rotation.

According to a preferred embodiment of the present invention such a result is achieved because of the fact that by using the tilting hubs, the blades of each propeller, even if rhythmically tilting, assume in respect to their own hub, angles $\alpha$ which are practically equal (Fig. 7) and which are proportional to the lifting thrusts; if the lifting thrusts change, the angles $\alpha$ are increased or reduced together.

If the controls for the angle of incidence are connected to the extensions of the blades outboard of the articulated joints, so as to be influenced by the inclination of the blades in relation to the hubs, it is possible to obtain without additional means the desired automatic correction of the disturbing external effects.

To this end the levers 39 for controlling the incidence, instead of being connected to the sleeves 35 as in Fig. 5, must be directly connected to the extensions 43 of the blades, as illustrated by the levers 44 marked in dotted lines in said Fig. 5, so that their position is influenced by the angles that the blades assume in respect of the hubs.

It is thus evident that if, because of an external disturbing cause, the lifting power of the blades is reduced.

the angle of said blades in relation to the hubs is reduced, and therefore the extremities 45 of the dotted levers 44 (Fig. 5) tend to be lifted i. e. rise from the plane of the drawing; but as said extremities cannot move, being connected by the link-rods 40 to the swash plate 41—42, the blades are compelled to rotate around their longitudinal axis, and an increase of inclination results, which offsets most of the undesired reduction of lifting power.

Figure 8:
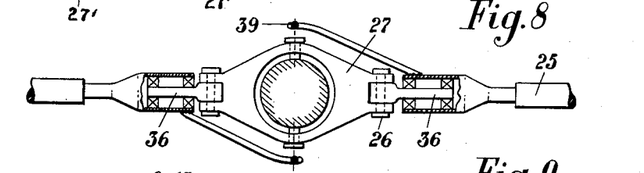
Figs. 8 and 9 are a plan view, and an elevation view, partially in cross-section, respectively of another embodiment of the connections of the propeller blades to the shaft.
Figure 9:
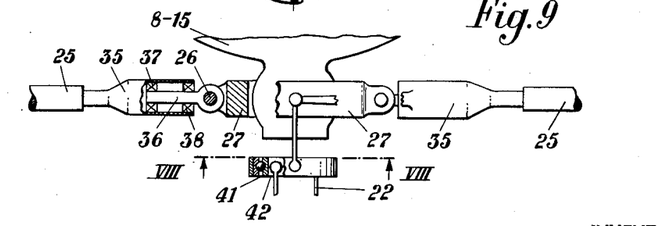
Figure 10:
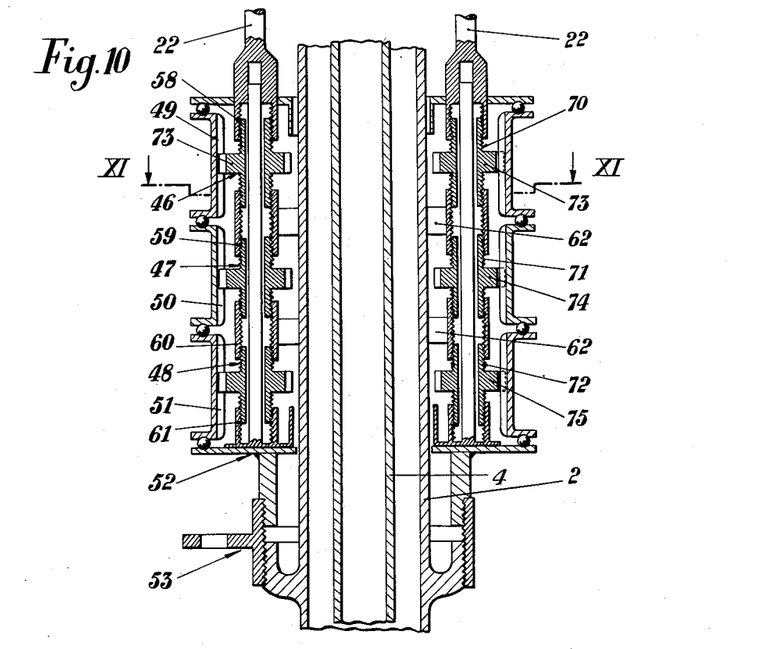
Figs. 10 and 11 are an elevation view in cross-section, and a plan view, respectively, of the control box allowing the different maneuvers of the apparatus.
Figure 11:
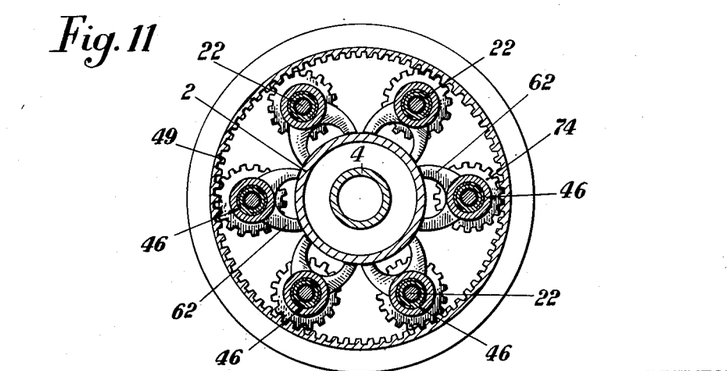

A different form of the connection of the blades and of the device for the automatic correction of the blades is shown in Figs. 8 and 9. In said Figs. the articulated joints 26 are directly connected to the tilting hub 27 and support the pivots 36 on which are mounted the bearings 37 and 38 around which turn the sleeves 35 integral with the blades 25, the sleeves are provided as before with control levers 39.

This form is analogous to that of Figs. 4 and 5, with the difference that the positions of the articulated joints 26 and the rotation supporting structure 35—36—37—38 for the blades are interchanged.

If a change of direction in a horizontal plane is desired, the pilot has to raise the swash plate of one propeller and to lower the swash plate of the other propeller; then the lifting power and the torque absorbed by a propeller increase, and the corresponding values of the other propeller are reduced; the total lifting power is unvaried, but the torques are not compensated and cause a differential torque in the horizontal plane which modifies the direction of the apparatus.

If finally the pilot wishes the transverse or longitudinal trim of the helicopter to be changed, and thus also a desired horizontal translation, he has only to incline both the swash plates; a cyclic variation of the incidence is thus obtained, which as is known, because of the aerodynamic reactions, causes the revolution planes of the propellers to be inclined and therefore the lifting resultant ceases to pass through the center of gravity of the helicopter and gives rise to a moment which varies the trim of the helicopter as desired.

Each swash plate, as already stated, is controlled by a group of three rods 22 and therefore:

(a) For lifting or lowering the apparatus it is necessary to raise or lower the six rods of the two plates together;

(b) for changing the direction it is necessary to lift the three rods controlling one swash plate and to lower the three rods controlling the other swash plate;

(c) for transversally displacing the apparatus it is necessary to displace the six rods unequally, so as to incline in a predetermined plane the two swash plates; and (d) for longitudinal movement it is necessary to displace the six rods unequally, so as to incline the two swash plates in another plane.

In order to obtain the above displacements, three adjusting screws are mounted lengthwise in series on each rod 22. By means of these screws the length of each rod can be independently varied.

The adjusting screws 46—47—48 are formed by a plurality of threaded spindles 70—71—72 having oppositely pitched and in some instances differently pitched threads at the two ends, and have in a central position toothed wheels 73—74—75 meshing with the internally toothed annular gears 49—50—51.

The ends of each spindle are engaged in threaded sleeves having corresponding threads; said sleeves are prevented from rotating by the arms 62 slidable on the column 2.

The upper sleeve 58 is directly fixed on the rod 22 and engages the upper threads of the spindle of the adjusting screw 46, the lower threads of said spindle being in turn engaged by the upper threads of the sleeve 59. The lower threads of the sleeve 59 engage the upper threads of the spindle of the adjusting screw 47, and the lower threads of said spindle are engaged by the upper threads of the sleeve 60. The lower threads of the sleeve 60 are engaged by the upper threads of the spindle of the adjusting screw 48.

The lower threads of the spindle of the adjusting screw 48 are engaged by the sleeve 61 which is fixed on the end plate of casing 52, which casing may be axially displaced by means of the threaded sleeve 53. When casing 52 is axially displaced, the six rods 22 are moved together therewith, thus allowing the helicopter to be lifted and lowered.

This solution of the problem is a considerable improvement as compared with similar systems previously used.

Rotation of the annular gear 49 causes the six adjusting screws 46 to rotate. Three of these latter are threaded in inverse direction to the other three, and thus three rods are lowered and three are lifted (direction control). All of the threads on the spindles of adjusting screws 46 are of the same pitch.

Rotation of the annular gear 50 causes the six adjusting screws 47 to rotate. These screws have threads with suitably chosen pitches that are different from each other such that said rotation causes an unequal adjustment of the six rods, thus causing the transverse movement of the helicopter.

Finally, the rotation of the annular gear 51 causes the six adjusting screws 48 to rotate, and since these also have threads with suitably chosen pitches which are different from each other, said rotation causes an unequal displacement of the six rods such that longitudinal movement of the helicopter is accomplished.

Said control system is irreversible and allows the pilot to release the control levers at will and it further intercepts the vibratory motions transmitted by the propellers which would apreciably disturb the pilot.

Figure 12:
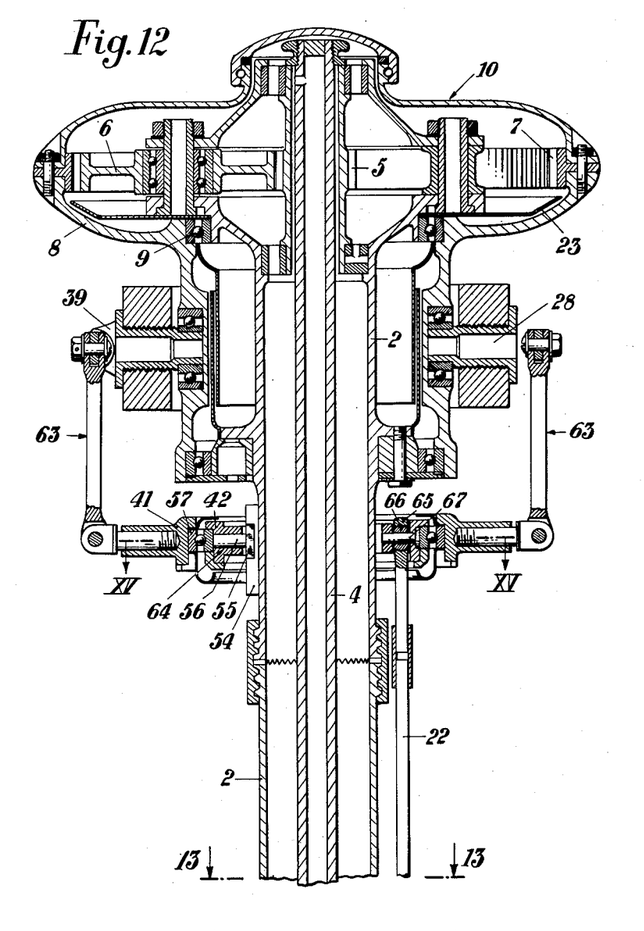
Fig. 12 is an elevation view in cross-section of the constructive embodiment of the upper speed reduction gears and the control hub of the upper propeller.
Figure 13:
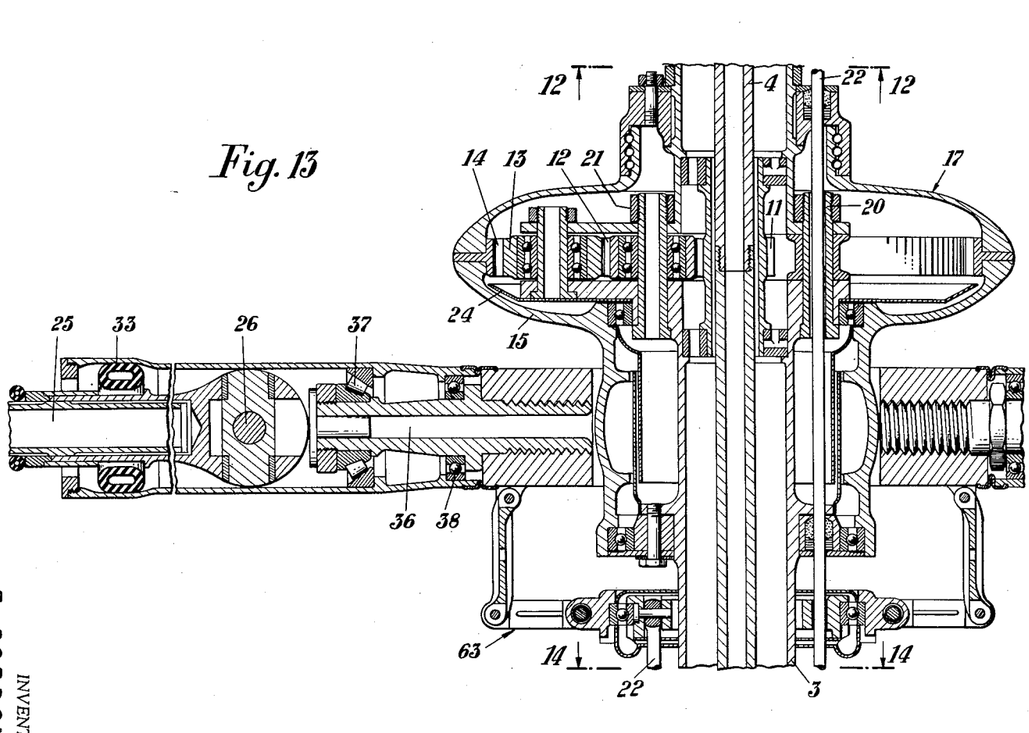
Fig. 13 is an elevation view in cross-section of the constructive embodiment of the lower speed reducer and of the control hub of the lower propeller.
Figure 14:
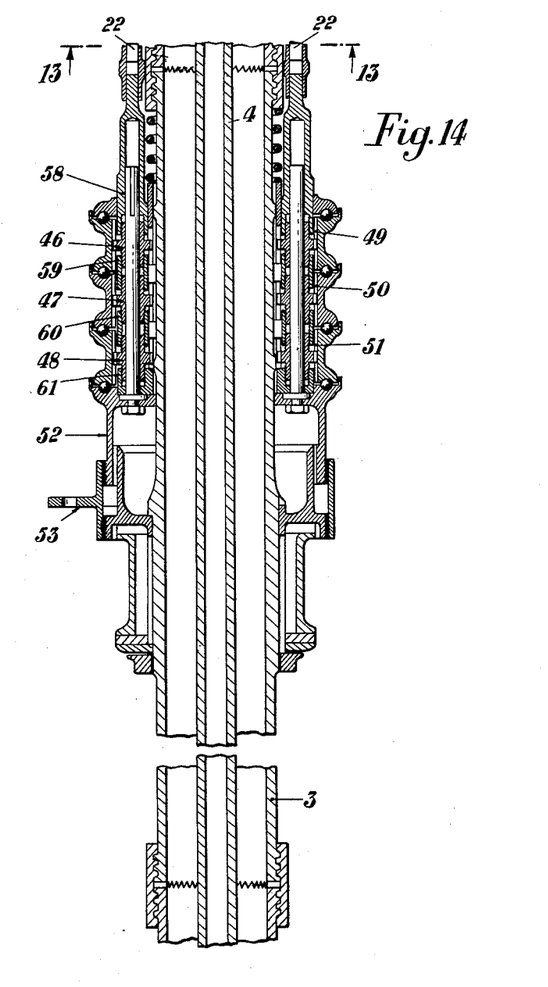
Fig. 14 is an elevation view in cross-section of the constructive embodiment of the control mechanism.
Figure 15:
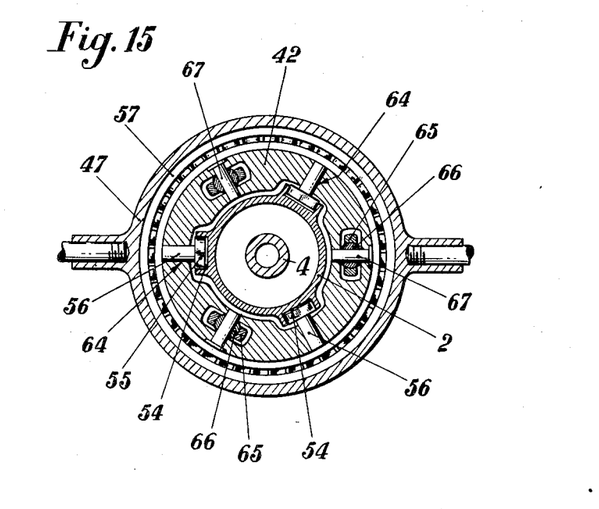
Fig. 15 is a cross-section taken along line XV—XV of Fig. 12.

Figs. 12, 13 and 14 show a constructive embodiment of the helicopter diagrammatically described and illustrated above. For better understanding and as the component parts correspond to those already described, the reference numerals are the same for the corresponding parts.

To control the movements of the swash plates with respect to the stationary tube 2, three longitudinal grooves 54 are provided on the latter at the height of each swash plate which form guides for three pivots 64. Each pivot is formed of a parallelopiped-shaped head 55 and a cylindrical shank 56. The head 55 extends into the groove 54, and the cylindrical shank 56 is housed in a cylindrical bore in the part 42 of the swash plate. Pivots 64 have the function of preventing the part 42 of the swash plate from rotating and of insuring the centering thereof with respect to the axis of the stationary tube 2 during the movements of the swash plate. A clearance between the head 55 and the walls of the groove 54 allows the swash plate to be raised, lowered and inclined at will, by means of rods 22, within predetermined limits.

To allow the tilting of the swash plate, rods 22 end in rings 65 which engage spherical joints 66 which are in turn connected by means of a bolt 67 to the part 42 of the swash plate. Between the part 42 of the swash plate and the rotating part 41 thereof a bearing 57 is interposed.

The three axes of the pivots 64 cross at a point located on the axis of the tube and their crossing point remains always on the axis of the tube 2 during the tilting of the swash plate with respect to the stationary tube.

The external part 41 of the swash plate is rotated at a speed equal to that of the propeller above by means of the articulated arms 63.

I claim:

1. In a helicopter of the type having two rotors rotating in opposite directions, the combination of a stationary tube, an upper rotor and a lower rotor supported in superposed relation by said tube, a driving shaft contained in the said tube, blades on said rotors being allowed to take incidences variable to a desired extent, said rotors each comprising a drum rotating around said tube, a central pinion in said drum for said lower rotor mounted on said driving shaft, an annular gear adjacent to the inner wall of said drum, three pairs of pinions, each pair being interposed between the central pinion and said annular gear, said pairs of pinions being adapted to impart to said annular gear a rotation in a direction opposite to the rotation of the upper one of said two rotors, said stationary tube being interrupted at said lower drum and being provided with two flanges, said flanges being joined to each other by means of six bolts axially bored, three of the said bolts being arranged to form the shafts around which the internal pinions of said three pairs of pinions rotate, a lower and an upper swash plate mounted on said tube underneath the lower and upper rotors, each of said swash plates being formed by two concentric rings, the internal one of which is tiltable with respect to and slidable on the stationary tube and the external one is rotatable around said inner ring, a hub for each of said rotors which surrounds its respective drum and is pivoted thereon by means of two pivots perpendicular to the tube for tilting in a vertical direction, each of said tilting hubs being provided with two projecting arms perpendicular to said pivots last mentioned, a sleeve mounted on each of said arms and rotatable around its longitudinal axis with respect to the tilting hub, a pivot mounted on the free end of each of said sleeves and perpendicular to the latter, a blade introduced into each of said sleeves and pivoted on the pivot of the latter to flap in a vertical direction, an articulated link fixed at one end of each of said sleeves and pivoted at the other end on said external rings of said swash plates, manually operable controlling means to move said lower swash plate and said upper swash plate, said controlling means comprising six rods, three of which are connected to said lower swash plate and the other three are connected to said upper swash plate, the three rods last mentioned passing through three of said bored bolts which connect the flanges of said stationary tube, said six rods being adapted to change the pitch of said blades.

2. A helicopter as claimed in claim 1 further comprising three guides provided for on the supporting tube at each swash plate, three pivots connecting the swash plate to said supporting tube, each pivot being formed of a parallelopiped-shaped head and a cylindrical shank, said head movably engaging said guides and said shank penetrating into said swash plate, the crossing point of the axes of the three pivots always being located on the axis of the supporting tube during the tilting of the swash plate.

3. A combination as claimed in claim 1, further comprising controlling means to vary the pitch of the blades including a casing slidable along said supporting tube, a threaded sleeve on said tube which engages said casing, siad threaded sleeve being manually operable for sliding said casing along said tube, the ends of said six rods opposite said swash plates being enclosed in said casing, six sets of three adjusting screws mounted in superposed positions one set on the end of each of said rods and contained in said casing, each adjusting screw being formed by a spindle provided at the two ends with threads and provided in the central zone with a toothed wheel, three annular gears manually operable independently of each other, each of the said gears meshing with one toothed wheel in each set of the three of said adjusting screws, an upper sleeve fixed to the end of each rod penetrating said casing, said sleeve last mentioned being innerly threaded to mesh with the upper outer thread of the uppermost spindle of the uppermost adjusting screw, a sleeve fixed to the bottom of said casing and innerly threaded to mesh with the lower outer thread of the lowermost spindle of the lowermost adjusting screw, two slidable and non-rotatable sleeves disposed in intermediate position between said uppermost and said lowermost sleeves, each of said intermediate sleeves being innerly threaded at the two ends to engage respectively with the lower outer thread and the upper outer thread of two adjacent threaded spindles, means holding each of said sleeves against rotation, the unit of said adjusting screws and of said annular gears being adapted to selectively vary the length of said rods and to change the pitch of said blades.

4. A combination as claimed in claim 3 wherein the spindles of the uppermost adjusting screws engaging with the rods which operate the lower swash plate have a thread with the pitch equal but opposite to the pitch of the thread of the spindles of the three uppermost adjusting screws engaging with the rods which operate the upper swash plate, whereby the rotation of the upper one of said three annular gears causes three of said rods to be lowered and the other three of said rods to be lifted.

5. A combination as claimed in claim 3 wherein the spindles of the lowermost and intermediate adjusting screws have a pitch different from each other, whereby the rotation of the intermediate and the lower of the three annular gears imparts a different displacement to the six controlling rods.

References Cited in the file of this patent
UNITED STATES PATENTS

| 1,921,805 | Bordoni | Aug. 8, 1933 |
| 1,938,091 | Wick | Dec. 5, 1933 |
| 2,256,918 | Young | Sept. 23, 1941 |
| 2,394,846 | Cox, Jr. | Feb. 12, 1946 |
| 2,505,759 | Faulkner | May 2, 1950 |
| 2,580,514 | Campbell | Jan. 1, 1952 |
| 2,587,104 | Breguet | Feb. 26, 1952 |
| 2,639,776 | Stanley | May 26, 1953 |

FOREIGN PATENTS

| 64,262 | Netherlands | Oct. 10, 1949 |

OTHER REFERENCES

American Helicopter Publication, June 1949, pages 11 and 21.